(12) United States Patent
Roberge

(10) Patent No.: US 10,815,885 B2
(45) Date of Patent: Oct. 27, 2020

(54) ANTI-ICE SYSTEMS FOR ENGINE AIRFOILS

(71) Applicant: UNITED TECHNOLOGIES CORPORATION, Farmington, CT (US)

(72) Inventor: Gary D. Roberge, Tolland, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 137 days.

(21) Appl. No.: 16/046,090

(22) Filed: Jul. 26, 2018

(65) Prior Publication Data

US 2020/0032708 A1  Jan. 30, 2020

(51) Int. Cl.
| | |
|---|---|
| *F02C 7/047* | (2006.01) |
| *F01D 15/10* | (2006.01) |
| *F04D 29/54* | (2006.01) |
| *F04D 29/58* | (2006.01) |

(52) U.S. Cl.
CPC ............ *F02C 7/047* (2013.01); *F01D 15/10* (2013.01); *F04D 29/541* (2013.01); *F04D 29/5853* (2013.01); *F05D 2220/323* (2013.01); *F05D 2220/768* (2013.01); *F05D 2240/12* (2013.01); *F05D 2240/14* (2013.01); *F05D 2240/30* (2013.01)

(58) Field of Classification Search
CPC . F02C 7/047; F01D 5/08; F01D 5/147; F01D 15/10; F01D 25/10; F01D 25/08; F04D 29/5853; F04D 29/541; F05D 220/323; F05D 2220/768; F05D 2240/12; F05D 2240/14; F05D 2240/30; F05D 2260/20
See application file for complete search history.

(56) References Cited

U.S. PATENT DOCUMENTS

| | | | |
|---|---|---|---|
| 5,281,091 A | 1/1994 | Dooley et al. | |
| 8,006,934 B2 * | 8/2011 | Alexander | F02C 7/047 219/526 |
| 9,193,466 B2 * | 11/2015 | Calder | B64D 15/14 |
| 9,642,190 B2 | 5/2017 | Jarvinen | |
| 9,708,929 B2 | 7/2017 | Szwedowicz et al. | |
| 9,909,448 B2 * | 3/2018 | Gerstler | F01D 9/041 |

(Continued)

FOREIGN PATENT DOCUMENTS

| | | |
|---|---|---|
| EP | 1593595 | 11/2005 |
| EP | 1820943 | 8/2007 |

(Continued)

OTHER PUBLICATIONS

European Patent Office, European Search Report dated Dec. 10, 2019 in Application No. 19188461.8.

*Primary Examiner* — Courtney D Heinle
*Assistant Examiner* — Sang K Kim
(74) *Attorney, Agent, or Firm* — Snell & Wilmer L.L.P.

(57) ABSTRACT

An anti-ice system for a gas turbine engine may comprise a power generating device and a first thermally conductive applique comprising a first heating circuit. The power generating device may comprise a first component configured to rotate about an axis and generate a current. A first conductive layer may electrically couple the first heating circuit and the first component of the power generating device.

16 Claims, 4 Drawing Sheets

(56) References Cited

U.S. PATENT DOCUMENTS

| | | | | |
|---|---|---|---|---|
| 2008/0041842 A1* | 2/2008 | Alexander | ............... | F01D 9/065 |
| | | | | 219/541 |
| 2010/0326050 A1* | 12/2010 | Schilling | ................. | F01D 15/10 |
| | | | | 60/268 |
| 2014/0366552 A1* | 12/2014 | Szwedowicz | ........... | F02C 7/047 |
| | | | | 60/779 |
| 2015/0377129 A1* | 12/2015 | Ward | ........................ | F01D 15/10 |
| | | | | 60/39.093 |
| 2016/0353523 A1* | 12/2016 | Jarvinen | .................... | F01D 5/08 |
| 2017/0298760 A1* | 10/2017 | Vallino | .................... | F01D 9/041 |
| 2018/0066538 A1* | 3/2018 | Radomski | ............... | F01D 25/10 |
| 2019/0233128 A1* | 8/2019 | Klonowski | ............ | H02K 21/48 |
| 2019/0345836 A1* | 11/2019 | Terwilliger | .............. | F01D 11/24 |

FOREIGN PATENT DOCUMENTS

| | | | | |
|---|---|---|---|---|
| EP | 2412939 | | 2/2012 | |
| GB | 2319942 | | 6/1998 | |
| WO | WO-2019116671 A1 * | | 6/2019 | ............. F04D 29/58 |

\* cited by examiner

ANTI-ICE SYSTEMS FOR ENGINE AIRFOILS

FIELD

The present disclosure relates to anti-ice systems for aircrafts structures, and, more specifically, to anti-ice systems for airfoils of a gas turbine engine.

BACKGROUND

Under various conditions, ice may accrete on rotating airfoils (e.g., fan blades) and other surfaces of a gas turbine engine. In some situations, the ice may shed asymmetrically, resulting in rotor imbalance due to differing fan blade ice mass and/or ice mass distribution variation as a function of radial location. This variation in mass typically exists in a zone beginning at a radially inward portion of the leading edge airfoil and extending outward to a point where gravitational ("G") and/or centrifugal forces result in a more uniform shedding. The imbalance resulting from asymmetric ice mass can result in passenger discomfort and perceived noise and/or cabin vibration. In addition, the magnitude of the imbalance may increase over time as higher bypass ratio engines with lower blade tip speed fans are introduced.

SUMMARY

An anti-ice system for a gas turbine engine is disclosed herein. In accordance with various embodiments, the anti-ice system may comprise a power generating device and a first thermally conductive applique comprising a first heating circuit. The power generating device may comprise a first component configured to rotate about an axis and generate a current. A first conductive layer may electrically couple the first heating circuit and the first component of the power generating device.

In various embodiments, the first heating circuit may comprise a plurality of resistor circuits. In various embodiments, the power generating device may further comprise a first magnet located over a first side of the first component, and a second magnet located over a second side of the first component opposite the first side of the first component.

In various embodiments, the first component may comprise a Faraday disk. In various embodiments, a first end of the first conductive layer may be coupled to a positive pole of the first component and a second end of the first conductive layer opposite the first end may be coupled to a negative pole of the first component.

In various embodiments, the power generating device may comprise a piezoelectric device. In various embodiments, the anti-ice system may further comprise a second thermally conductive applique comprising a second heating circuit. A second conductive layer may electrically couple the second heating circuit and the first component of the power generating device.

In various embodiments, the first thermally conductive applique may be configured to attach to a pressure side of an airfoil of the gas turbine engine, and the second thermally conductive applique may be configured to attach a suction side of the airfoil.

A gas turbine engine is also disclosed herein. In accordance with various embodiments, the gas turbine engine may comprise a fan and a compressor located aft of the fan. A shaft may be configured to drive a rotation of the fan and the compressor. An anti-ice system may be thermally coupled to the fan. The anti-ice system may comprise a power generating device comprising a first component rotationally coupled to the shaft, a first thermally conductive applique bonded to a first airfoil of the fan and comprising a first heating circuit, and a first conductive layer electrically coupling the first heating circuit and the first component of the power generating device.

In various embodiments, the anti-ice system may further comprise a second thermally conductive applique bonded to a second airfoil of the fan and comprising a second heating circuit. A second conductive layer may electrically couple the second heating circuit and the first component of the power generating device.

In various embodiments, the power generating device of the anti-ice system may further comprise a first magnet located over a first side of the first component, and a second magnet located over a second side of the first component opposite the first side of the first component. In various embodiments, the first magnet and the second magnet may be coupled to a static structure of the gas turbine engine. In various embodiments, the static structure may comprise at least one of a vane of the compressor, or a compressor case structure.

In various embodiments, the power generating device of the anti-ice system may comprise a piezoelectric device. In various embodiments, the first thermally conductive applique may extend over a leading edge of the first airfoil. In various embodiments, the first thermally conductive applique may comprise a metallic layer cover the first heating circuit.

A fan section of a gas turbine engine is also disclosed herein. In accordance with various embodiments, the fan section may comprise a plurality of airfoils configured to rotate about an axis of the gas turbine engine. An anti-ice system may be coupled to a rotating component of the fan section. The anti-ice system may comprise a power generating device comprising a first component configured to rotate about the axis. A first heating circuit may be located over a surface of a first airfoil of the plurality of airfoils. A first conductive layer may electrically couple the first heating circuit and the first component of the power generating device.

In various embodiments, the anti-ice system may further comprise a second heating circuit located over a surface of a second airfoil of the plurality of airfoils, and a second conductive layer electrically coupling the second heating circuit and the first component of the power generating device.

In various embodiments, the power generating device may further comprise a first magnet located over a first side of the first component, and a second magnet located over a second side of the first component opposite the first side of the first component. In various embodiments, the power generating device may comprise a piezoelectric device.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

Figure 1:
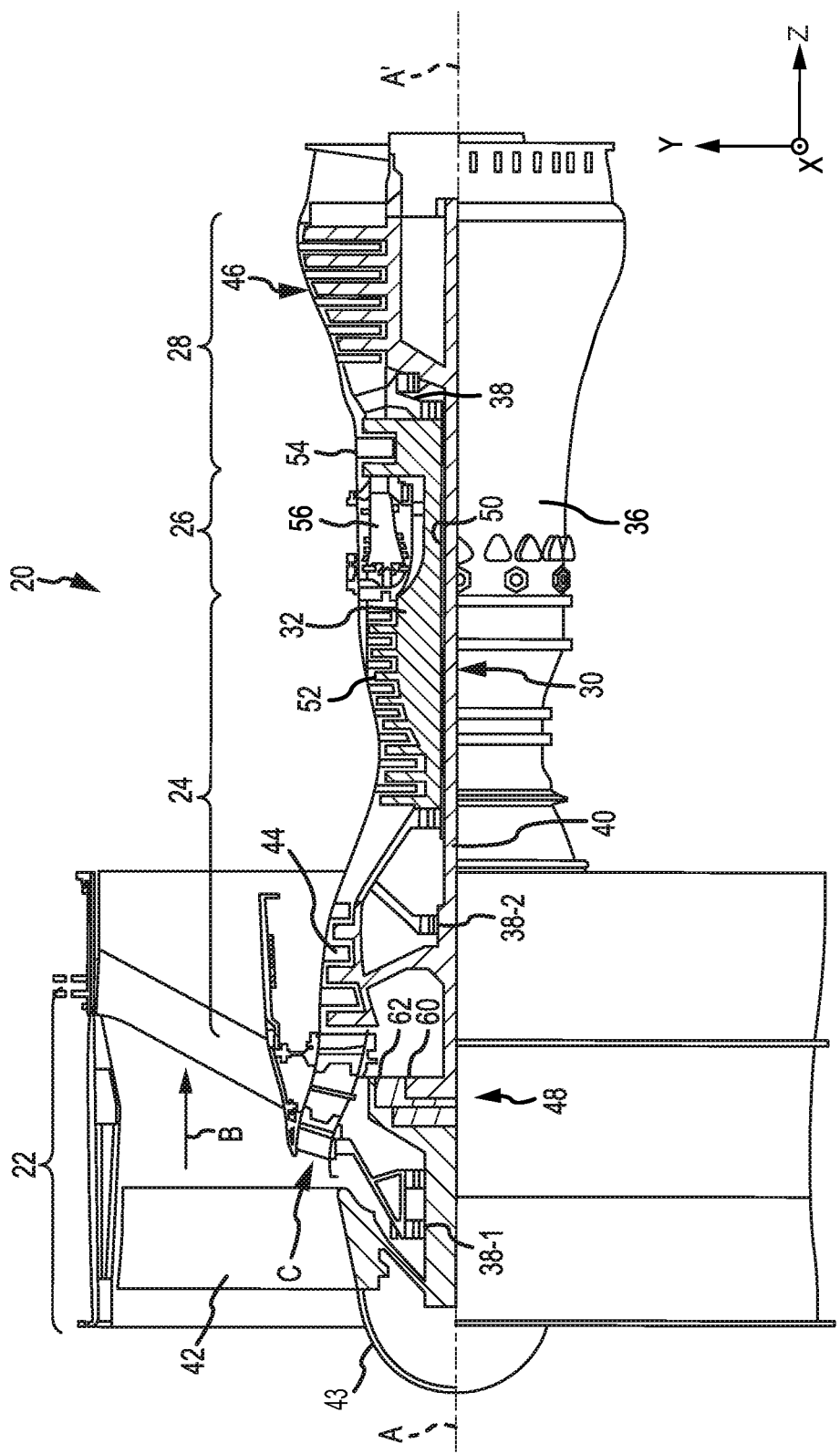
- FIG. 1 illustrates a cross-sectional view of an exemplary gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component.

Anti-ice systems for a gas turbine engine are described herein, in accordance with various embodiments. In various embodiments, the anti-ice systems include a heating circuit bonded via a thermally conductive applique to one or more airfoil surface(s) of the gas turbine engine. The heating circuits may each be electrically coupled to a power generating device (e.g., piezoelectric device or a Faraday disc) mounted to a rotor of the gas turbine engine. The power generating device may be configured to generate an electrical load (e.g., a current), during engine operation. The heating circuit may increase a temperature of the airfoil surface to either reduce ice accretion (anti-ice) or promote increased ice shedding (de-ice). Reducing ice accretion and/or shedding ice more frequently may reduce rotor imbalance. Accordingly, anti-ice systems as disclosed herein may improve engine stability, thrust, and/or thrust specific fuel consumption (TSFC) as blade tip clearances in the fan section and/or in the low pressure compressor and/or in the low pressure turbine may be reduced due to decrease in rotor imbalance and radial whirl. In addition, desired fan airfoil aerodynamic shape may be retained through a reduction in ice accretion and resulting detrimental impact on fan stage efficiency. The anti-ice systems disclosed herein may also be easily retrofit into existing engine architectures, as the anti-ice systems may be incorporated into the engine without changing current rotor support structures.

With reference to FIG. 1, a gas turbine engine 20 is disclosed, in accordance with various embodiments. Gas turbine engine 20 may comprise a two-spool turbofan that generally incorporates a fan section 22, a compressor section 24, a combustor section 26, and a turbine section 28. In operation, fan section 22 may drive a fluid (e.g., air) along a bypass flow-path B, while compressor section 24 drives fluid along a core flow-path C for compression and communication into combustor section 26, and then expansion through turbine section 28. FIG. 1 provides a general understanding of the sections in a gas turbine engine, and is not intended to limit the disclosure. The present disclosure may extend to all types of applications and to all types of turbine engines, including, for example, turbojets, turboshafts, and engines including more or less than two spools.

In various embodiments, gas turbine engine 20 may comprise a low speed spool 30 and a high speed spool 32 mounted for rotation about an engine central longitudinal axis A-A' relative to an engine static structure 36 via one or more bearing systems 38 (shown as, for example, bearing system 38-1 and bearing system 38-2 in FIG. 1). It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 may couple inner shaft 40 to a rotating fan structure. A nose cone 43 may be located forward of fan 42. Nose cone 43 may be rotationally coupled to fan 42, such that nose cone 43 rotates with fan 42.

High speed spool 32 may comprise an outer shaft 50 that interconnects a high pressure compressor ("HPC") 52 and high pressure turbine 54. A combustor 56 may be located between HPC 52 and high pressure turbine 54. Inner shaft 40 and outer shaft 50 may be concentric and may rotate via bearing systems 38 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 44 and HPC 52, mixed and burned with fuel in combustor 56, and expanded over high pressure turbine 54 and low pressure turbine 46. Low pressure turbine 46 and high pressure turbine 54 may rotationally drive low speed spool 30 and high speed spool 32, respectively, in response to the expansion.

Figure 2A:
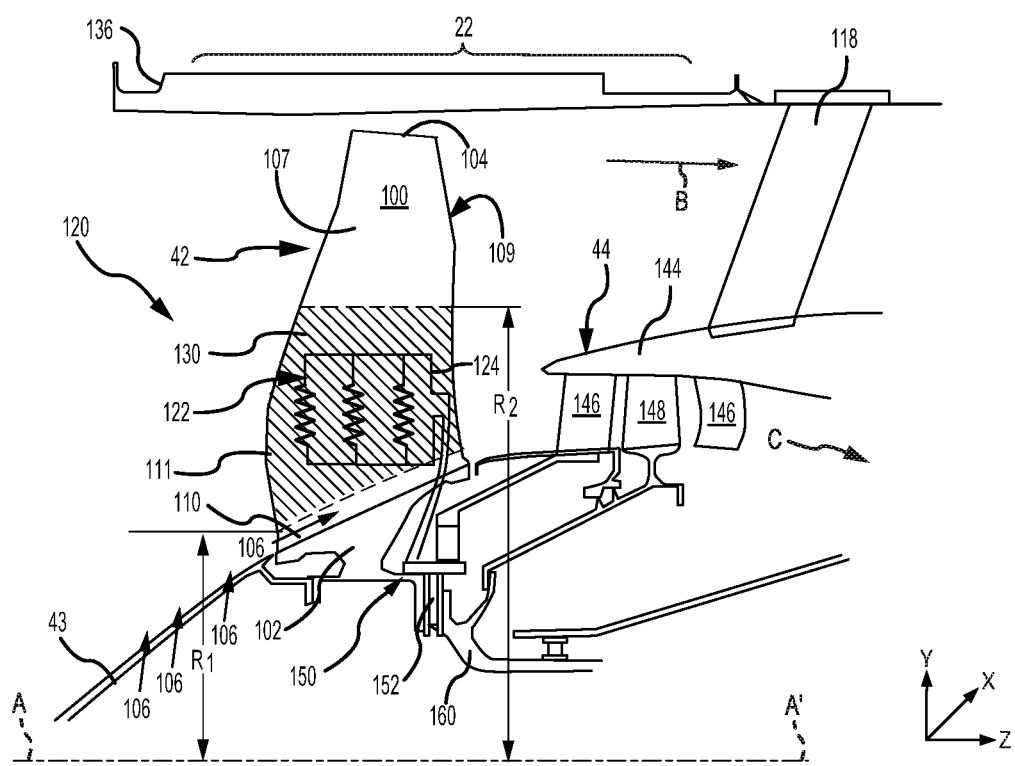
FIG. 2A illustrates an anti-ice system in the fan section of a gas turbine engine, in accordance with various embodiments.

With reference to FIG. 2A, a cross-section of fan section 22 of gas turbine engine 20 is illustrated, in accordance with various embodiments. Fan 42 includes a plurality of airfoils 100 (one shown) located circumferentially about a rotor disk 102. Airfoils 100 extend radially outward from rotor disk 102. Airfoils 100 may be coupled to or may be monolithic with rotor disk 102. Rotor disk 102 (and thus airfoils 100 by virtue of their attachment to rotor disk 102) is configured to rotate about engine central longitudinal axis A-A'. A static (i.e., non-rotating) fan exit guide vane 118 may be located aft of rotating airfoils 100. Exit guide vane 118 may be coupled to a fan case 136 and a compressor case 144. Compressor case 144 may be located radially outward of rotating blades 148 and static vanes 146 of low pressure compressor 44. Rotation of rotor disk 102 and compressor blades 148 may be driven by a shaft 160. In various embodiments, shaft 160 may be rotationally coupled to inner shaft 40 of low speed spool 30, with momentary reference to FIG. 1.

Each airfoil 100 includes a blade tip 104 located radially inward of fan case 136. Airfoils 100 may include a generally concave pressure side 107 and a generally convex suction side 109 located opposite pressure side 107.

During operation, warm air 106 may flow aft from nose cone 43. Warm air 106 is generally located proximate a radially inward end 110 of airfoil 100. Stated differently, warm air 106 is located proximate rotor disk 102 and a root of airfoils 100. Warm air 106 may reduce or deter the accretion of ice proximate radially inward end 110 of airfoil 100. In the radially outward areas of airfoil 100 (e.g., proximate blade tip 104), ice may shed due to G force generated by the rotation of airfoils 100. In various embodiments, ice may be more prone to form radially outward of warm air 106 (i.e., radially outward of a radius R1) and radially inward of where the G force is increased (i.e., radially inward of a radius R2).

In accordance with various embodiments, an anti-ice system 120 may be coupled to fan 42. Anti-ice system 120 may comprise a plurality of heating circuits 122 (one shown). Each heating circuit 122 may be coupled to an airfoil 100 of fan 42. In various embodiments, heating circuit 122 may comprise a plurality of resistor circuits. Heating circuit 122 may be formed by a conductive layer 124. In various embodiments, conductive layer 124 comprises an electrically conductive wire. Conductive layer 124 may be a metal, metal alloy, or any other suitably conductive material. For example, conductive layer 124 may comprise, one or more layers of conductive material, such as aluminum, copper, tin, nickel, gold, silver, and/or alloys thereof.

In various embodiments, anti-ice system 120 may comprise a thermally conductive applique 130. In various embodiments, thermally conductive applique 130 may include heating circuit 122. Thermally conductive applique 130 may be thermally coupled to heating circuit 122, and may thermally couple heating circuit 122 to airfoil 100. Heat generated by current flowing through heating circuit 122 may be conducted from conductive layer 124 to the surface of airfoil 100 via thermally conductive applique 130.

Thermally conductive applique 130 is made of a thermally conductive material configured to help spread heat across the surface of airfoil 100. For example, thermally conductive applique 130 may comprise copper, tin, titanium, steel, nickel, aluminum, and/or alloys thereof. In various embodiments, one or more thermally conductive applique(s) 130 may be bonded to the surfaces of airfoil 100. In various embodiments, a first thermally conductive applique 130 having a first heating circuit 122 may be bonded to pressure side 107 of airfoil 100 and a second thermally conductive applique 130 having a second heating circuit 122 may be bonded to suction side 109 of airfoil 100. In various embodiments, a first thermally conductive applique 130 may be configured to bond to pressure side 107. For example, the first thermally conductive applique 130 may follow the concave shape of pressure side 107. In various embodiments, a second thermally conductive applique 130 may be configured to bond to suction side 109. For example, the second thermally conductive applique 130 may follow the convex shape of suction side 109. In various embodiments, a single thermally conductive applique 130 and single heating circuit 122 may be located over both pressure side 107 and suction side 109 of airfoil 100, such that thermally conductive applique 130 and heating circuit 122 extend over/wrap around a leading edge 111 of airfoil 100.

Thermally conductive applique 130 may be bonded to airfoil 100 via sputtering, adhesive, or any other suitable attachment method. In various embodiments, heating circuit 122 and/or thermally conductive applique 130 may be formed on the surface of airfoil 100 via photo etching or additive manufacturing processes using the deposition of one or more materials. In various embodiments, the means and/or materials for attaching thermally conductive applique 130 may be selected based on bonding compatibility with the material of airfoil 100. In various embodiments, thermally conductive applique 130 may include a metallic coating covering heating circuit 122 and bonded to airfoil 100.

Thermally conductive applique 130 may be configured (e.g., the radial and axial lengths of thermally conductive applique 130 may be selected) to cover the portions of airfoil 100 that experience, or are susceptible to, ice accretion. For example, thermally conductive applique 130 may extending from a first radius R1 of airfoil 100, as measured from engine central longitudinal axis A-A', to a second radius R2 of airfoil 100, as measured from engine central longitudinal axis A-A'. In various embodiments, radius R1 may correspond the radial location where warm air 106 is no longer effective in melting or deterring ice formation (i.e., the radial location where ice accretion tends occur). In various embodiments, radius R2 may correspond the radial location where G forces tend to cause ice to shed from airfoil 100. In various embodiments, thermally conductive applique 130 may extend to blade tip 104 and/or to radially inward end 110 of airfoil 100.

Conductive layer 124 electrically couples heating circuit 122 to a power generating device 150 of anti-ice system 120. Power generating device 150 may comprise a first component 152. First component 152 is rotating component. In various embodiments, first component 152 may be rotationally coupled to fan 42 and/or shaft 160. First component 152 may rotate about engine central longitudinal axis A-A'. Rotation of first component 152 generates a current which travels through conductive layer 124 and heating circuit 122. The current generates heat, which is conducted to airfoil 100.

Figure 2B:
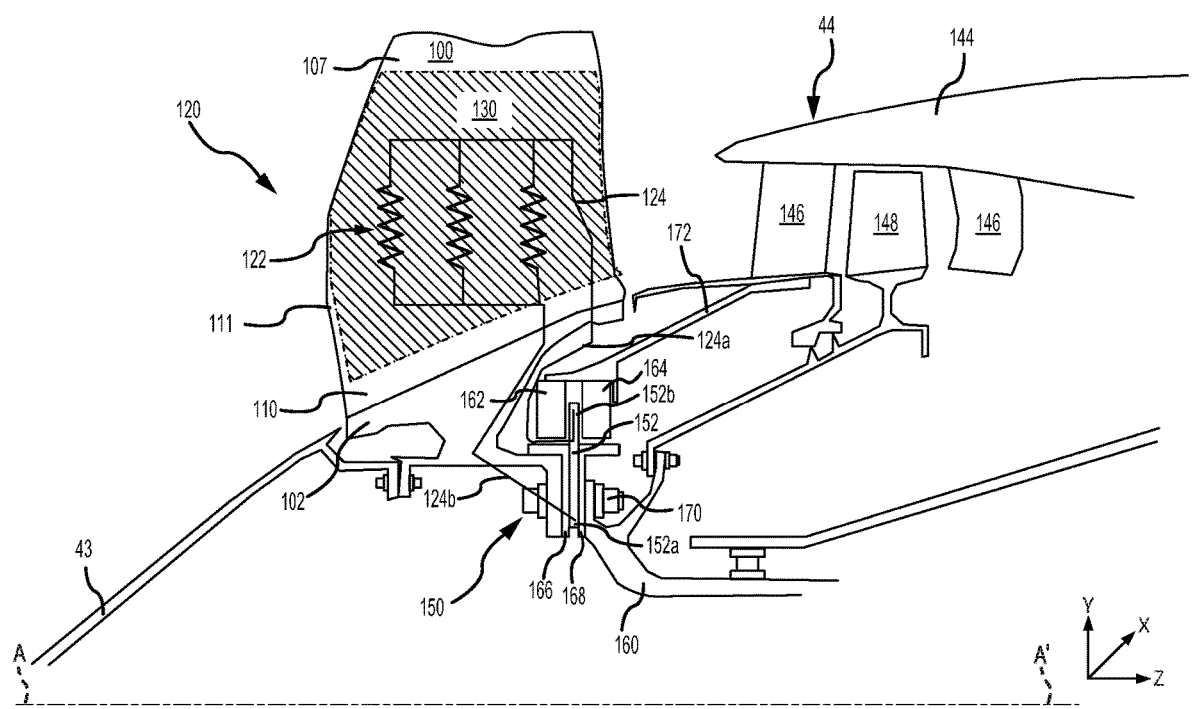
FIG. 2B illustrates further details of the anti-ice system in FIG. 2A, in accordance with various embodiments.

With reference to FIG. 2B, additional details of power generating device 150 are illustrated, in accordance with various embodiments. In various embodiments, power generating device 150 may comprise a Faraday disc. First component 152 may comprise a conductive disc (e.g., an annular metal or metal alloy structure). A first magnet 162 may be located over a first surface of first component 152, and a second magnet 164 may be located over a second surface of first component 152 opposite the first surface of first component 152 and first magnet 162. First and second magnets 162, 164 may be static, non-rotating structures. In various embodiments, a strut 172 may couple first and second magnets 162, 164 to a static support structure, for example, to a vane 146 of low pressure compressor 44, and/or to compressor case 144.

In various embodiments, first component 152 is coupled to shaft 160. In various embodiments, a fastener 170, for example, a bolt, nut, rivet, etc., may couple first component 152 to rotor disk 102 and shaft 160. In various embodiments, a first electrical insulator 166 may be located between first component 152 and rotor disk 102, and a second electrical insulator 168 may be located between first component 152 and shaft 160.

First component 152 is configured to rotate in a plane perpendicular to a static magnetic field created by first and second magnets 162, 164. Rotation of first component 152 through the magnetic field creates a potential difference and electrical polarity between a radially outward end 152b and a radially inward end 152a of first component 152. A first end 124a (e.g., a positive end) of conductive layer 124 may be electrically coupled to radially outward end 152b of rotating first component 152, and a second end 124b (e.g., a negative end) of conductive layer 124 may be electrically coupled to radially inward end 152a rotating first component 152. Connection of conductive layer 124 to the opposite ends of first component 152 creates a current through conductive layer 124 and heating circuit 122. Accordingly, during operation of gas turbine engine 20, the rotation of fan 42 (i.e., of low speed spool 30 in FIG. 1) causes anti-ice system 120 to generate heat which may deter ice formation on fan airfoils 100.

Figure 3:
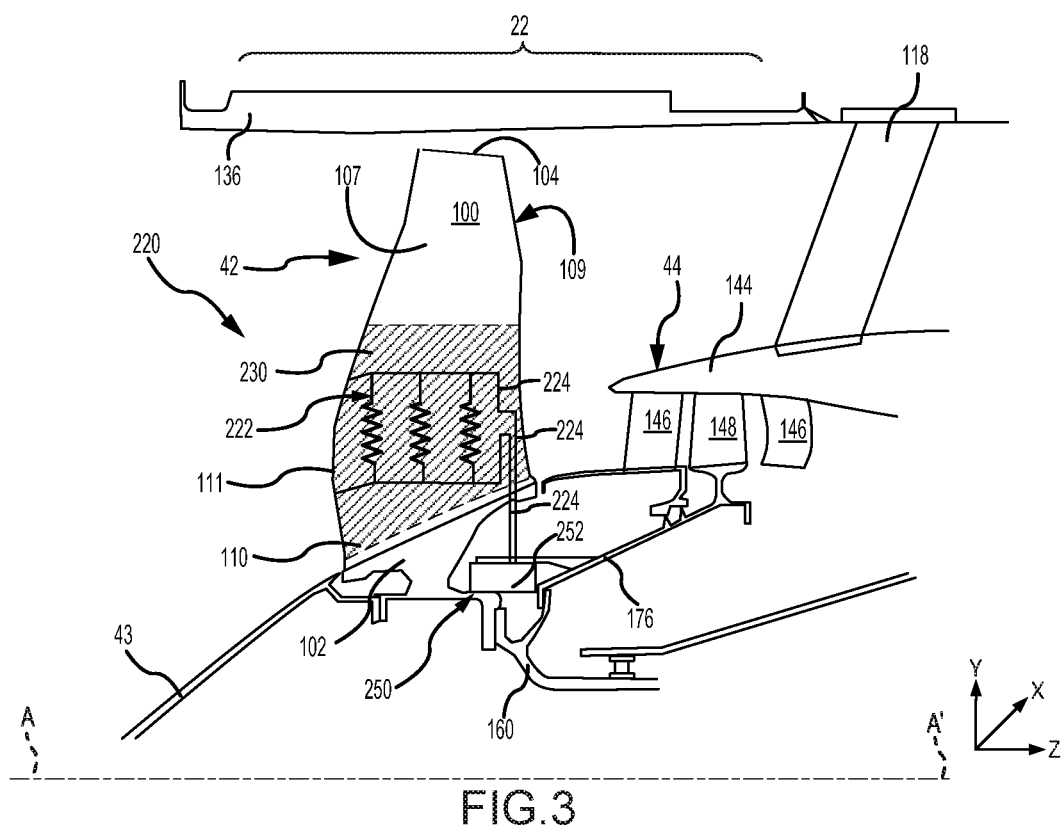
FIG. 3 illustrates an anti-ice system in the fan section of a gas turbine engine, in accordance with various embodiments.

With reference to FIG. 3, an anti-ice system 220 for fan 42 is illustrated, in accordance with various embodiments. Anti-ice system 220 comprises a plurality of heating circuits 222 (one shown), similar to heating circuits 122 in FIG. 2A. A heating circuit 222 may be coupled to each airfoil 100 in fan 42. Heating circuit 222 may be formed by a conductive layer 224, similar to conductive layer 124 in FIG. 2A.

Anti-ice system 220 may comprise a thermally conductive applique 230, similar thermally conductive applique 130 in FIG. 2A. In various embodiments, thermally conductive applique 230 may include heating circuit 222. Thermally conductive applique 230 and heating circuit 222 are located over both pressure side 107 and suction side 109 of airfoil 100, such that thermally conductive applique 230 and heating circuit 222 extend over/wrap around leading edge 111 of airfoil 100.

Conductive layer 224 electrically couples heating circuit 222 to a power generating device 250 of anti-ice system 220. Power generating device 250 may comprise a first component 252. First component 252 is a rotating component. In various embodiments, first component 252 may be rotationally coupled to shaft 160 and/or to a shaft 176 configured to drive rotation of compressor blades 148. First component 252 may rotate about engine central longitudinal axis A-A'. Rotation of first component 252 generates a current which travels through conductive layer 224 and heating circuit 222. The current generates heat, which is conducted to the surface of airfoil 100.

In various embodiments, power generating device 250 may comprise one or more piezoelectric device(s). In various embodiments, first component 252 may comprise a solid material (e.g., crystal or ceramic), capable of generating an electrical charge in response to applied mechanical stress, for example, in response to G and centrifugal force applied to first component 252 as it rotates about engine central longitudinal axis A-A'. Stated differently, rotation of first component 252 generates an electrical charge within first component 152. First and second ends 224a, 224b of conductive layer 224 may be electrically coupled to rotating first component 252. Connection of conductive layer 224 to first component 252 creates a current through conductive layer 224 and heating circuit 222. The current generates heat which is conducted to the surface of airfoil 100. Accordingly, during operation of gas turbine engine 20, the rotation of fan 42 (i.e., of low speed spool 30) causes anti-ice system 220 to generate heat which may deter ice formation on fan airfoils 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An anti-ice system for a gas turbine engine, comprising:
   a power generating device comprising:
      a first component configured to rotate about an axis and generate a current;
      a first magnet located forward of a first surface of the first component, the first surface being oriented in a forward direction; and
      a second magnet located aft of a second surface of the first component, the second surface of the first component being oriented away from the first surface and in an aft direction;
   a first thermally conductive applique comprising a first heating circuit; and
   a first conductive layer electrically coupling the first heating circuit and the first component of the power generating device.

2. The anti-ice system of claim 1, wherein the first heating circuit comprising a plurality of resistor circuits.

3. The anti-ice system of claim 1, wherein the first component comprises a Faraday disk.

4. The anti-ice system of claim 3, wherein a first end of the first conductive layer is coupled to a positive pole of the first component and a second end of the first conductive layer opposite the first end is coupled to a negative pole of the first component.

5. The anti-ice system of claim 1, further comprising:
   a second thermally conductive applique comprising a second heating circuit; and
   a second conductive layer electrically coupling the second heating circuit and the first component of the power generating device.

6. The anti-ice system of claim 5, wherein the first thermally conductive applique is configured to attach to a pressure side of an airfoil of the gas turbine engine, and wherein the second thermally conductive applique is configured to attach a suction side of the airfoil.

7. A gas turbine engine, comprising:
   a fan including a rotor disk and a plurality of airfoils located circumferentially about the rotor disk;
   a compressor located aft of the fan;
   a shaft configured to drive a rotation of the rotor disk and the compressor; and
   an anti-ice system thermally coupled to the fan, the anti-ice system comprising:
      a power generating device comprising a first component rotationally coupled to the shaft and the rotor disk, a first magnet located over a first surface of the first component, and a second magnet located over a second surface of the first component opposite the first side of the first component,
      a first thermally conductive applique bonded to a first airfoil of the fan and comprising a first heating circuit; and
      a first conductive layer electrically coupling the first heating circuit and the first component of the power generating device; and
      a strut coupling the first magnet and the second magnet to at least one of a vane or a case of the compressor.

8. The gas turbine engine of claim 7, wherein the anti-ice system further comprises:
   a second thermally conductive applique bonded to a second airfoil of the fan and comprising a second heating circuit; and
   a second conductive layer electrically coupling the second heating circuit and the first component of the power generating device.

9. The gas turbine engine of claim 8, wherein
   the first magnet is located forward of the first surface of the first component, the first surface of the first component being oriented in a forward direction; and
   the second magnet is located aft of the second surface of the first component, the second surface being orient away from the first surface and in an aft direction.

10. The gas turbine engine of claim 7, wherein the first thermally conductive applique extends over a leading edge of the first airfoil.

11. The gas turbine engine of claim 7, wherein the first thermally conductive applique comprises a metallic layer covering the first heating circuit.

12. A fan section of a gas turbine engine, comprising:
   a rotor disk configured to rotate about an axis of the gas turbine engine;
   a plurality of airfoils extending radially outward from the rotor disk;
   a shaft configured to drive a rotation of the rotor disk;
   an anti-ice system thermally coupled to the plurality of airfoils, the anti-ice system comprising:
      a power generating device comprising a piezoelectric device, the piezoelectric device being mounted to a surface of at least one of the rotor disk or the shaft;
      a first heating circuit located over a first surface of a first airfoil of the plurality of airfoils; and
      a first conductive layer electrically coupling the first heating circuit and the first component of the power generating device.

13. The fan section of claim 12, wherein the anti-ice system further comprises:
   a second heating circuit located over a surface of a second airfoil of the plurality of airfoils; and
   a second conductive layer electrically coupling the second heating circuit and the power generating device.

14. The fan section of claim 12, wherein the anti-ice system further comprises a thermally conductive applique bonded to the first airfoil, the thermally conductive applique comprising the first heating circuit.

15. The fan section of claim 14, wherein the anti-ice system further comprises:
   a second heating circuit located over a second surface of the first airfoil opposite the first surface of the first airfoil; and
   a second conductive layer electrically coupling the second heating circuit and the power generating device.

16. The fan section of claim 14, wherein the first heating circuit is located over a second surface a second surface of the first airfoil opposite the first surface of the first airfoil.

* * * * *